United States Patent [19]
Goddard

[11] 3,863,769
[45] Feb. 4, 1975

[54] STRUCTURAL MEMBERS FOR PROVIDING RELEASABLE CONNECTIONS AND STRUCTURES INCORPORATING THE MEMBERS

[75] Inventor: Norman H. Goddard, Chateauquay Center, Quebec, Canada

[73] Assignees: JCN Wire Industries Ltd., East Montreal, Canada; JCN Wire Industries Ltd., Quebec, Canada

[22] Filed: Dec. 4, 1972

[21] Appl. No.: 311,553

[30] Foreign Application Priority Data
Sept. 21, 1972 Canada.............................. 152300

[52] U.S. Cl................ 211/182, 211/177, 403/247, 403/347, 403/383
[51] Int. Cl. ............................................ A47f 5/10
[58] Field of Search ........ 211/177, 182; 248/62, 56; 403/230, 246, 247, 346, 347, 383, 359, 375, 361; 52/758 A; 174/154, 155, 156, 157

[56] References Cited
UNITED STATES PATENTS

| | | | |
|---|---|---|---|
| 557,174 | 3/1896 | Turner | 403/247 X |
| 560,455 | 5/1896 | Wyman et al. | 403/247 X |
| 2,207,860 | 7/1940 | Hassler | 248/62 X |
| 2,576,049 | 11/1951 | Shott | 211/182 UX |
| 2,769,169 | 10/1956 | Munzig | 174/157 |
| 2,793,764 | 5/1957 | Stork | 211/182 X |
| 3,244,388 | 4/1966 | Coffman | 248/62 |
| 3,246,768 | 4/1966 | Carlos | 211/182 X |
| 3,527,361 | 9/1970 | Janetka | 211/182 |

*Primary Examiner*—Roy D. Frazier
*Assistant Examiner*—Robert W. Gibson, Jr.
*Attorney, Agent, or Firm*—Alan Swabey; Robert E. Mitchell

[57] ABSTRACT

A construction for connecting together tubular members, particularly tubular members employed in the construction of garment racks. One end of one of the members is formed to provide a pair of spaced-apart cylindrical stiffening portions, parallel to, and symmetrical about, the longitudinal axis of the member and joined together by a web. A corresponding slot is formed in the other member to receive this portion. The edge of the slot cooperates with a portion of the other member adjacent the connecting portion to frictionally hold the members together.

In accordance with a further feature, the first and second members are factory preassembled. In order to insure that the parts do not come apart during shipping, the stiffening portions at the bottom are expanded by force after insertion of the first member into the slot so that they are larger than the slot to thereby prevent the first member from becoming detached from the second.

8 Claims, 9 Drawing Figures

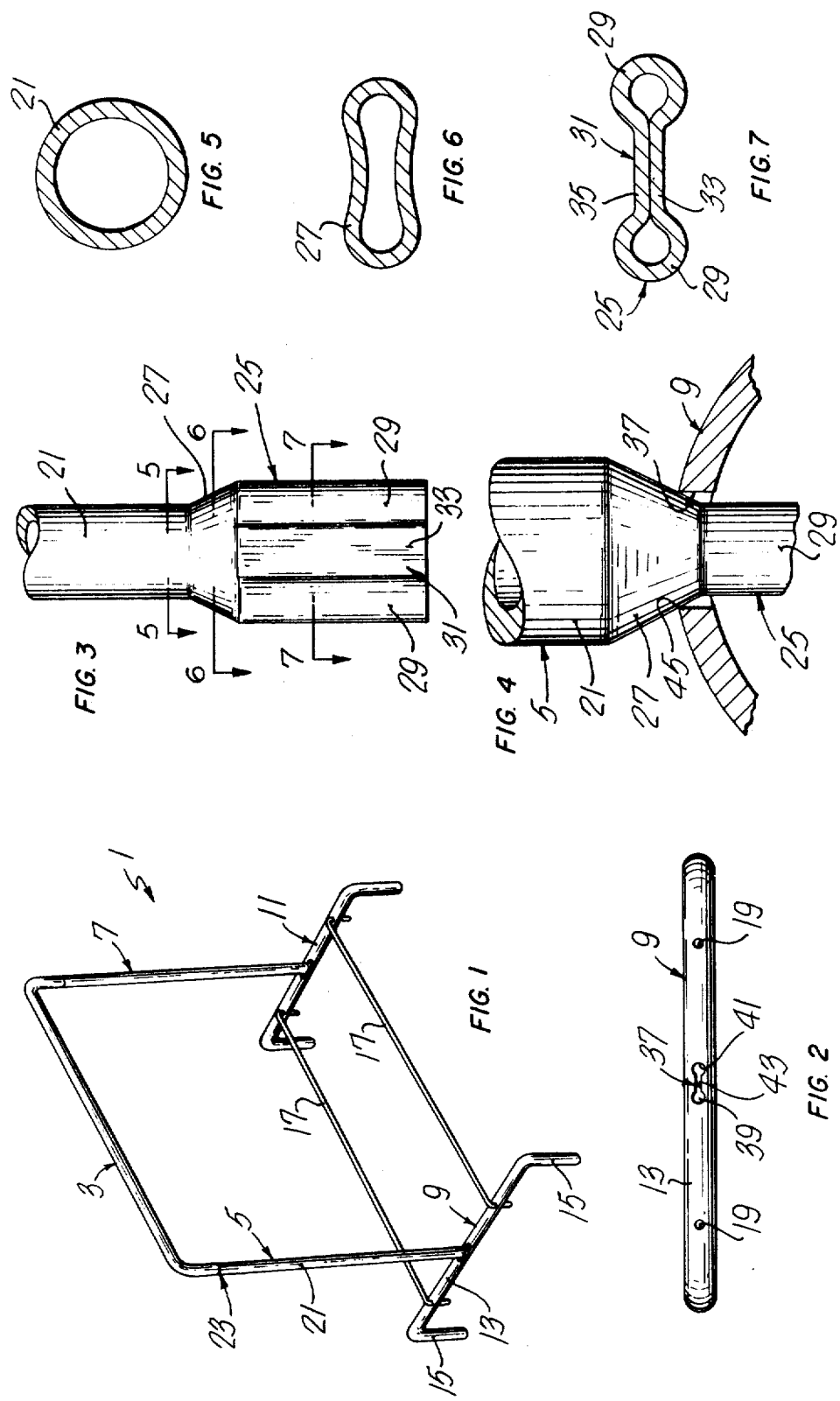

3,863,769

STRUCTURAL MEMBERS FOR PROVIDING RELEASABLE CONNECTIONS AND STRUCTURES INCORPORATING THE MEMBERS

BACKGROUND OF THE INVENTION

1. Field of the Invention

This invention relates to structural members for use in lightweight structures.

The invention is more particularly directed toward structural members adapted to be connected together, preferably releasably, to form assembled structures, particularly garment rack structures, and is also directed toward the structures formed from the members.

2. Description of the Prior Art

Lightweight structural members, particularly tubular members, are usually connected together by separate fastening means. The requirement of separate fastening means increases the cost of erected structures due to the additional parts requried and time required to erect the structures. Attempts to connect the structural members without employing separate fastening means usually results in loose connections and/or weakness in the connection.

The assembly of tubular structural members to form garment racks presents a particular problem since garment racks must be frequently disassembled and assembled for transportation. If separate fastening means are employed to connect the structural members of the garment rack together, they are liable to be lost, and in addition, they increase the cost of the rack and the time required to assemble or disassemble the garment rack. Attempts to construct garment racks without requiring separate fastening means in the assembling operation have not been too successful. The garment racks are subjected to rough usage, and previously used fastener-free connections between the structural members had a tendency to come apart during use or, more seriously, to eventually fail.

SUMMARY OF THE INVENTION

The present invention provides an improved connection between two structural members which does not require the use of additional, separate fastening means. The improved connection permits the members to be readily assembled, and, if desired, readily disassembled while at the same time providing a strong connection between the members when they are assembled. The structural members employed in providing the connection are simply and relatively inexpensively formed. The structural members provide structures, such as a garment rack, which can be readily assembled, or, if desired, disassembled, and which generally maintain their assembled condition during rough usage while providing a strong structure, particularly at the connections between the members. The members employed in the structures, such as a garment rack, are preferably tubular and at least some of the members have one end formed in a novel manner to fit in a cooperating aperture in other of the members to provide a novel, releasable connection between the members.

The invention is particularly directed toward an elongated structural member which is used to form part of an assembled structure. The member has a main tubular section and a connecting section at one end thereof. The connecting section has a pair of spaced apart, elongated portions which extend substantially parallel to, and substantially symmetrically about, the longitdinal axis of the member. The elongated portions merge into the tubular section of the member.

The elongated structural member is adapted to be connected to a second structural member which has aperture means for receiving the connecting section of the first member. The edge of the aperture in the second member frictionally cooperates with a merging section of the first member joining the connecting section and the main section so as to hold the two members together when the connecting section is inserted into the aperture means.

In a preferred embodiment, the invention is particularly directed toward a garment rack which includes a pair of leg members, a pair of vertical posts, and a top cross-piece joining the upper ends of the posts together. The lower end of each post is connected to a respective leg member. Each post has a main tubular section and a connecting section at the lower end of the post joined to the tubular section by a merging section. The connecting section has a pair of spaced apart, elongated portions extending substantially parallel to, and substantially symmetrically about, the longitudinal axis of the post. The leg members have aperture means for receiving the connecting portions of the posts. Each aperture means is preferably sized to freely receive the connecting section of the post and the edge of the aperture from which the post extends frictionally cooperates with the merging section to hold the leg and post together.

BRIEF DESCRIPTION OF THE DRAWINGS

The invention will now be described in detail having reference to the accompanying drawings, wherein:

FIG. 1 is a view of an assembled garment rack incorporating the invention;

FIG. 2 is a top plan view of one of the leg members of the garment rack;

FIG. 3 is a front elevation view of the lower portion of the vertical post of the garment rack;

FIG. 4 is a detail view showing the connection between the lower end of the post and the leg member;

FIGS. 5, 6 and 7 are cross-sectional views of the vertical post of the garment rack to show details of its construction;

DETAILED DESCRIPTION OF THE DRAWINGS

Figure 8:
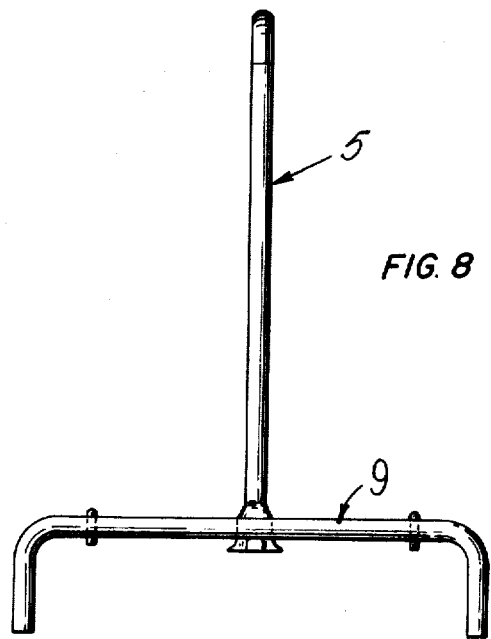
FIG. 8 is a view of a partially preassembled unit in accordance with the invention.

The garment rack 1, shown in FIG. 1, can comprise a top cross-piece 3, vertical posts 5 and 7, and leg members 9, 11. These members are all preferably tubular and of cylindrical cross-section.

The leg members 9, 11 have a base 13 with legs 15 at each end thereof. The garment rack can also include tie rod members 17 turned down at their ends to be inserted through holes 19 in the base 15 of the leg members and located on either side of the connection between the vertical posts and the leg members so as to provide additional support for the assembled garment rack.

Each vertical post 5 and 7 includes a main tubular section 21. The upper end 23 of the post telescopically receives an end of the top cross-piece. Each post has a connecting section 25 at the lower end therefrom. The connecting section 25 is joined to the lower end of the tubular section 21 by a merging section 27. The connecting section 25 and the merging section 27 are relatively short compared to the length of the tubular section of each post.

The connecting section 25 of each post includes two spaced apart, elongated stiffening portions 29. The stiffening portions are preferably cylindrical and small in diameter compared to the diameter of the tubular section 21. The stiffening portions 29 extend substantially parellel to the longitudinal axis of the post and are symmetrical about the longitudinal axis. The two stiffening portions 29 are joined together by a web portion 31. The web portion preferably comprises two walls 33 and 35 adjacent one another.

The connecting section is formed integrally with the remainder of the vertical post by deforming the lower end of the post. Thus, the walls 33, 35 are integral with stiffening portions 29.

Each leg member 9, 11 has aperture means 37 for receiving the connecting section 25 of each post. The aperture means preferably comprises a slot extending in a direction parallel to the longitudinal axis of the leg member. The slot has a cross-sectional shape corresponding to the cross-sectional shape of the connecting section 25. Thus, the slot comprises two cylindrical portions 39, 41 joined together by a connecting slot 43. When the legs are made of cylindrical tubular members, a slot is formed in each of the diametrically opposed sections of the wall so as to permit the connecting section to pass right through the leg member, as shown in FIG. 1 of the drawings.

The slot is made slightly larger in area than the cross-sectional area of the connecting section 25 so as to allow the connecting section to be freely placed in the slot. The post is then jammed down toward the leg so as to cause the merging section 27, which flares outwardly from the connecting section to the tubular section, to frictionally engage the sharp upper edge 43 of the slot. This frictional connection releasably holds the post and leg member together. If desired, the end of the connecting section projecting out of the slot after passing through the leg member, can be peened or flared outwardly to provide a permanent connection.

The shape of the connecting portion of the post and the slot, particularly the two cylindrical stiffening portions 29, spaced apart by a web, provide rigidity for the connection so that the post is not weakened in a direction either parallel to the leg member or transversely thereto. The edge 45 of the slot, biting longitudinal the tapered merging section, serves to firmly connect the members together. It is to be understood that the size of the aperture means 37 is only very slightly larger than the cross-sectional area of the connecting portion so as to provide a relatively tight fit. In addition, the connecting portion, in passing through both the upper and lower wall portions of the cylindrical leg member, minimizes any tendency of the post to rock in any direction relative to the leg member.

With the invention as shown in FIGS. 1 to 5, the tolerance on the stiffening portion 29 is very rigid, and very slight deviations from this tolerance will produce a rack which is almost impossible to assemble by housewives, etc. who are the biggest customers for this item. This is due to the fact that the stiffening portion 29 will not fit into the slot 37. For this reason, the stiffening portion must be produced with great accuracy.

In order to avoid the costs associated with this accuracy, it is possible to partially preassemble the rack as illustrated in FIG. 8. Referring to FIG. 8, the vertical posts are factory installed in the leg members 9 and 11. The customer will then only have to install the cross piece 3 and the tie rod members 17 at home. As there is no difficulty with the tolerances on these parts, the preassembly of the vertical posts in the leg members obviates the need for highly toleranced parts.

Figure 9:
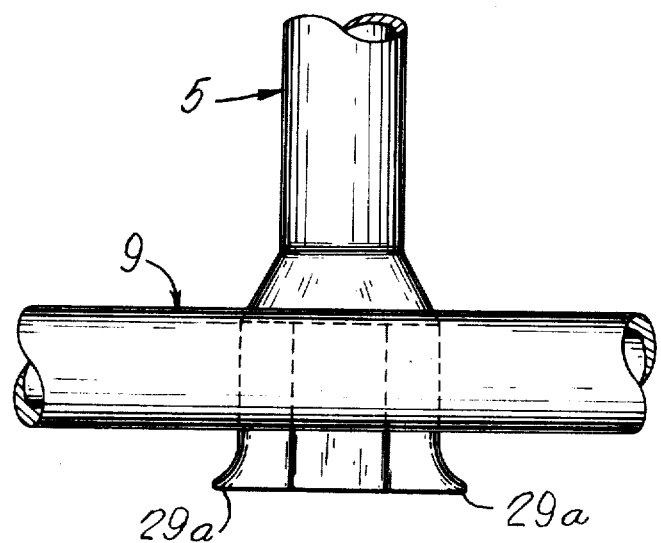
FIG. 9 illustrates the flaring of the stiffening portion when used with the FIG. 8 embodiment.

As the vertical posts could work their way loose from the leg members during shipping and handling, it is necessary to make the connection between these parts an almost permanent one. This is accomplished by forcing the bottom part of the stiffening member, below the leg member, open to produce an expanded portion 29a as illustrated in FIG. 9. The expanded portion is larger than the bottom slot corresponding to slot 37 so that the vertical post is prevented from working its way free from the leg member. Preferably, the expanded portion 29a is flare-shaped.

Although several embodiments have been described in the foregoing, this was for the purpose of illustrating, but not limiting the invention. Various modifications which will come readily to the mind of one skilled in the art are considered to be within the scope of the invention as defined in the appended claims.

I claim:

1. A pair of elongated structural members adapted to be connected together, one of said members having a main tubular section and a connecting section at one end of the tubular section, the connecting section being integral with and forming a deformed extension of said main tubular section, the connecting section having a pair of spaced apart, elongated portions and a web section joining the elongated portions, said web being formed integrally with said elongated portions and comprising a pair of adjacent wall sections, extensions of said wall sections forming a merging section flaring outwardly from the connecting section to the main tubular section and being joined integrally with said main tubular section, the elongated portions extending substantially parallel to, and substantially symmetrically about, the longitudinal axis of the one member, the other member having aperture means for receiving the connecting section of the first member, the shape and size of said aperture conforming substantially with the cross-sectional shape and size of the connecting section, whereby, when the connecting section of said first member is inserted in the aperture of said second member and forced in the direction of said second member, the first member will be releasably held in said second member by frictional engagement between edges of said aperture and said merging section of said web.

2. A member as claimed in claim 1, wherein the tubular section and the elongated portions are cylindrical in shape, and the diameter of the elongated portions is less than the diameter of the tubular section.

3. A pair of members as claimed in claim 2, wherein the second member is tubular and the aperture means is provided in diametrically opposed wall portions of the second member.

4. A pair of elongated structural members as defined in claim 3 wherein said elongated portions are inserted in said aperture means through one of said wall portions and wherein said elongated portions extend past the second wall portion to provide a preassembled unit;

the part of the elongated portions extending past the second wall portion being made larger than the aperture in the second wall portion;

whereby the elongated portions are held in said aperture means.

5. A pair of elongated structural members as defined in claim 4 wherein the elongated portions extending past the second wall portion are flare-shaped.

6. A garment rack including a pair of leg members, a pair of vertical posts and a top cross-piece, the upper ends of the posts joined by the cross-piece, the lower end of each post releasably connected to a respective leg member, each post having a main tubular section, the lower end of each post having a connecting section joined to the tubular section by a merging section, the connecting section being integral with and forming a deformed extension of said main tubular section, the connecting section having a pair of spaced apart, elongated portions extending substantially parallel to, and substantially symmetrically about, the longitudinal axis of the post, and a web section joining the elongated portions, said web being formed integrally with said elongated portions and comprising a pair of adjacent wall sections, said wall sections forming a merging section by flaring outwardly from the connecting section to the main tubular section and being joined integrally with said main tubular section at the upward end of said merging section, the leg members having aperture means for receiving the connecting portions of the posts, the shape and size of said aperture conforming substantially with the cross-sectional shape and size of the connecting section, whereby, when the connecting section of said first member is inserted in the aperture of said second member and forced in the direction of said second member, the first member will be releasably held in said second member by frictional engagement between endges of said aperture and said merging section.

7. A garment rack as claimed in claim 6, wherein the tubular section and the elongated portions of the post are cylindrical, and the diameter of the elongated portions is less than the diameter of the tubular section.

8. A garment rack as claimed in claim 7, wherein each leg member is cylindrical and the aperture means is provided in diametrically opposed wall portions thereof.

* * * * *